July 7, 1936.  E. A. BALDWIN  2,046,362

WINDSHIELD CONDENSATION PREVENTER

Filed Feb. 13, 1935

Inventor
Edward A. Baldwin
By Beaman + Langford
Attorney

Patented July 7, 1936

2,046,362

UNITED STATES PATENT OFFICE 2,046,362

WINDSHIELD CONDENSATION PREVENTER

Edward A. Baldwin, Jackson, Mich.

Application February 13, 1935, Serial No. 6,283

5 Claims. (Cl. 20—40.5)

This invention relates to improvements in window and windshield condensation preventers, wherein a pane of transparent material is maintained slightly spaced from the windshield to provide a dead air space and is secured at its border to the windshield.

Of the devices of the above character which have come into use, common window glass and celluloid have been used for the transparent pane, suitable adhesive tape being employed to secure the border of the pane to the inside of the windshield. Although relatively inexpensive, the cost of these devices has been too great to permit the same to be distributed as a premium, or to be given away as an advertising medium. Moreover, glass is relatively heavy and thus difficult to maintain in position upon the windshield, while celluloid, although of less weight than glass, is generally irregular in thickness and configuration, due to limitations in manufacturing methods. In the case of the celluloid pane, the enumerated imperfections result in uneven refraction of light producing blurred vision, which is particularly tiring to the eyes.

I have found that the above difficulties may be overcome by employing a transparent pane of "Cellophane" or other known type of extremely thin, flexible, transparent celluloid sheet material, or the like, for producing the dead air space upon the inside of the windshield or window. The use of such materials is particularly advantageous for the reason that, because of their extreme thinness, light rays passing therethrough are only slightly displaced due to refraction. The result is that, even though there be unevenness or slight imperfections in the surface of the pane, light rays passing through the pane are only imperceptibly distorted. Furthermore, the thinness and extreme flexibility of the "Cellophane" pane make it possible to stretch out the pane and attach it to the windshield in a substantially flat state.

An object of the invention, therefore, is to provide a window or windshield condensation preventer having a transparent pane of "Cellophane" or like material.

Another object of the invention is to provide an inexpensive, yet durable and effective window or windshield condensation preventer having a relatively thin flexible pane, and a flexible frame of paper or the like upon which advertisements may be printed.

A further object of the invention is to provide a window or windshield condensation preventer which may be readily applied by a filling station attendant, or the like, and is so inexpensive to manufacture that it may be given away as a premium or a form of advertising without charge.

Figure 1:
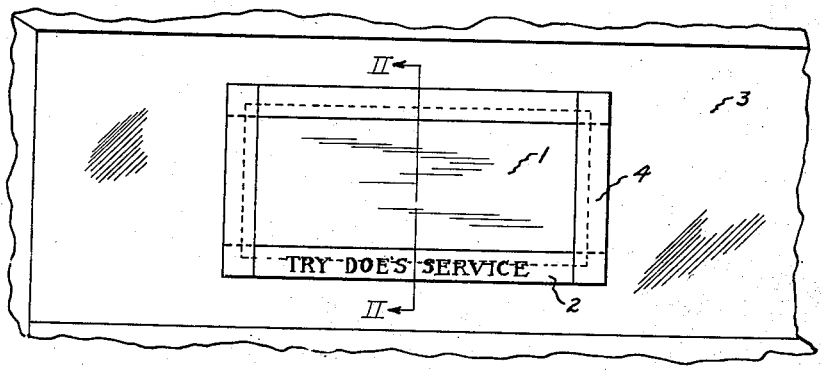
Figures 2, 3:
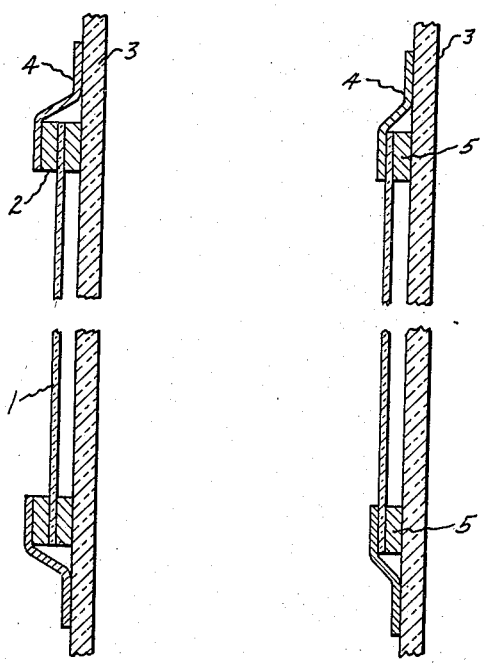

These and other objects will be apparent from the following specification when taken with the accompanying drawing in which, Fig. 1 is a side view of the windshield condensation preventer according to this invention, secured to a windshield, Fig. 2 is a section on the line II—II of Fig. 1, and Fig. 3 is a section similar to that of Fig. 2, but of a modified form.

Referring to the drawing, the reference character 1 indicates a pane of "Cellophane" or transparent material like "Cellophane" which has the usual characteristics of "Cellophane" in that it is transparent, relatively thin, and extremely flexible. The pane 1 is mounted in a rectangular frame 2 of cardboard, fiber or other suitable material having like characteristics as to ability to yield. In the preferred form of the invention, the frame 2 consists of two frames of the same size, one superimposed on the other with the pane 1 secured between them by a suitable adhesive. The frame 2 acts not only as a support for the pane, but also as a spacer to hold the pane 1 away from the windshield 3.

The frame 2 supporting the pane 1 is secured to the windshield 3 by a rectangular gummed frame 4 arranged to cover, and be adhesively secured to, the frame 2 and to overlap the outer edges thereof, the overlapping portions being adhesively secured to the windshield. The adhesive on the frame 4 is preferably of the type that must be moistened before using, this form of adhesive being superior to the types which do not require moistening, as it will readily form a bond on a cold windshield whereas the non-moistening types will not. The frame 4 is preferably, though not necessarily, constructed from paper in the form of strips or tapes, and may be plain or have advertising matter printed thereon. Preferably the "Cellophane" employed is of a moisture proof type.

The finished windshield condensation preventer may be manufactured very cheaply and is desirable for use as a premium or advertising device to be distributed without charge, such as at filling stations, for instance. It is my intention to furnish the article as a unit ready to apply to a windshield.

In assembling, care should be taken to secure the pane 1 to the frame 2 in such a manner that it is without waves or wrinkles. Thus when the frame 4 is adhesively secured to the windshield, it may be pulled taut in all directions and, acting in conjunction with the yieldable frame 2, stretches the pane 1 into a flat sheet spaced from the windshield and sealing between itself and the windshield a volume of dead air. The pane 1 is thus insulated from the cold windshield and moisture will not condense on it. Furthermore, moisture cannot get to the windshield. The result is that a clear space on the windshield the size of the pane 1 is provided through which the operator of the vehicle having the windshield may have an unobstructed vision. The thinness of the pane has the effect of making the irregularities in its thickness, if any, negligible, and its flexibility makes possible tightening to provide a flat surface. Thus, due to the characteristics of the material I employ for the pane of my condensation preventer, I am able to minimize distorted and blurred vision to an extent heretofore unknown in non-plate panes.

Figure 3 discloses an embodiment of the invention wherein a single thickness pane supporting frame 5 is used. The frame 5 is of the same material used in the construction of the frame 2. In this case, the pane 1 is secured to the outer side of the frame 5 and the frame 4 is secured to the portion of the pane 1 overlapping the frame 5. This form of the invention is merely more simplified than the preferred construction.

The foregoing description is considered merely as disclosing the examples of my invention, and I do not wish to be limited except by the scope of the following claims.

I claim:

1. A device of the character described for use on windshields or the like comprising a pane of a thin tissue like sheet of transparent material, and means bordering said pane for supporting the same spaced from the windshield and for securing the same to said windshield.

2. A device of the character described for use on windshields or the like comprising a pane of a thin tissue like transparent sheet material, and means comprising a supporting frame and a securing frame for maintaining said pane in fixed spaced relation to the windshield, and with said pane, sealing a volume of air between said pane and the windshield.

3. A device for preventing condensation, adapted to be secured to the inside of a windshield or the like comprising a flexible frame of fibrous material, a pane of relatively thin tissue like flexible transparent sheet material, characterized by its ability to transmit light rays without appreciable distortion, supported in said frame and spaced from the windshield by a portion of said frame, the flexibility of said frame and pane enabling the frame to be flatly adhered to the windshield, said pane having insufficient body to support itself in spaced relation with reference to the windshield without the rigidity of support afforded it by the frame with the latter adhered to the windshield.

4. A device of the character described for use on windshields or the like, comprising a pane of thin film-like transparent sheet material, means for spacing said pane from a windshield or the like, and a securing frame for securing said pane to a windshield or the like and sealing a volume of air between said pane and the windshield.

5. A device of the character described for use on windshields or the like, comprising a pane of thin film-like transparent sheet material, means for spacing said pane from a windshield or the like, and a securing frame for securing said pane to a windshield or the like and sealing a volume of air between said pane and the windshield, said securing frame comprising gummed paper-like material bordering said pane.

EDWARD A. BALDWIN.